(12) United States Patent
Nelson et al.

(10) Patent No.: US 9,547,944 B2
(45) Date of Patent: Jan. 17, 2017

(54) HEALTH MONITORING SYSTEM FOR DIAGNOSING AND REPORTING ANOMALIES

(71) Applicant: HONEYWELL INTERNATIONAL INC., Morristown, NJ (US)

(72) Inventors: Erik T. Nelson, Eden Prairie, MN (US); Andrew Peter Vechart, Plymouth, MN (US); Robert E De Mers, Nowthen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/735,807

(22) Filed: Jun. 10, 2015

(65) Prior Publication Data

US 2016/0364920 A1 Dec. 15, 2016

(51) Int. Cl.
*G01M 17/00* (2006.01)
*G07C 5/00* (2006.01)
*B60K 35/00* (2006.01)

(52) U.S. Cl.
CPC .............. *G07C 5/006* (2013.01); *B60K 35/00* (2013.01); *G07C 5/00* (2013.01)

(58) Field of Classification Search
CPC combination set(s) only.
See application file for complete search history.

(56) References Cited

U.S. PATENT DOCUMENTS

| 7,581,002 | B2 | 8/2009 | Royalty |
| 7,983,809 | B2 | 7/2011 | Kell et al. |
| 8,355,830 | B2 | 1/2013 | Kordonowy |
| 8,666,569 | B2 | 3/2014 | Goodrich et al. |
| 2004/0176887 | A1 | 9/2004 | Kent et al. |
| 2005/0046584 | A1* | 3/2005 | Breed ............... B60C 11/24 340/13.31 |
| 2006/0144997 | A1 | 7/2006 | Schmidt et al. |
| 2007/0217288 | A1 | 9/2007 | Barry et al. |

(Continued)

FOREIGN PATENT DOCUMENTS

| EP | 0997638 A2 | 5/2000 |
| EP | 1087343 A1 | 3/2001 |

OTHER PUBLICATIONS

Holguin M, et al.; Commercial Crew Launch Emergency Detection System—The Key Technology for Human Rating EELV; American Institute of Aeronautics and Astronautics; Retrieved from: http://www.ulalaunch.com/uploads/docs/Published_Papers/Human_Rating/EmergencyDetectionSystem, 2010.

(Continued)

*Primary Examiner* — Yonel Beaulieu
(74) *Attorney, Agent, or Firm* — Lorenz & Kopf, LLP

(57) ABSTRACT

A health monitoring system for monitoring a vehicle and a method for operating the same are provided. The system, for example, may include, but is not limited to, at least one sensor configured to collect data corresponding to the vehicle, an interface system, a memory, and a processor communicatively coupled to the at least one sensor, the interface system and the memory, the processor configured to: determine when the vehicle is experiencing an anomaly, collect, from the interface system, data corresponding to the anomaly from a user of the vehicle, and associate, the data collected from the interface system and the data collected from the at least one sensor.

18 Claims, 2 Drawing Sheets

(56) References Cited

U.S. PATENT DOCUMENTS

| | | |
|---|---|---|
| 2008/0040152 A1 | 2/2008 | Vian et al. |
| 2008/0051955 A1 | 2/2008 | Ross et al. |
| 2008/0147265 A1* | 6/2008 | Breed .................. G07C 5/0808 |
| | | 701/424 |
| 2009/0005928 A1 | 1/2009 | Sells et al. |
| 2009/0198422 A1 | 8/2009 | Vik et al. |
| 2009/0240604 A1* | 9/2009 | Thurston ............ G06Q 10/0875 |
| | | 705/29 |
| 2010/0023201 A1 | 1/2010 | Kinney et al. |
| 2011/0313614 A1 | 12/2011 | Hinnant, Jr. et al. |
| 2012/0101793 A1 | 4/2012 | Cheriere et al. |
| 2012/0191273 A1 | 7/2012 | Jacobs et al. |
| 2013/0166135 A1 | 6/2013 | Dunsdon |
| 2013/0184899 A1 | 7/2013 | Raynaud et al. |
| 2013/0274991 A1 | 10/2013 | Cheriere et al. |
| 2014/0095939 A1* | 4/2014 | Bell .................... G06F 11/3495 |
| | | 714/39 |
| 2014/0309820 A1 | 10/2014 | O'Dell et al. |
| 2014/0336871 A1 | 11/2014 | Catt et al. |
| 2015/0054663 A1 | 2/2015 | Pennell et al. |
| 2016/0009179 A1* | 1/2016 | Biderman ............... B60L 15/20 |
| | | 701/22 |
| 2016/0014252 A1* | 1/2016 | Biderman ............... B60L 15/20 |
| | | 455/420 |

OTHER PUBLICATIONS

Butcher S. W.; Assessment of Condition-Based Maintenance in the Department of Defense; LG903B1, Aug. 2000.
UTC Aerospace Systems; Health and Usage Management Systems (HUMS); 4223B LIT 4/13; Rosemount Aerospace Inc., 2013.
Extended EP Search Report for Application No. 16172545.2-1953 dated Jul. 11, 2016.

* cited by examiner

HEALTH MONITORING SYSTEM FOR DIAGNOSING AND REPORTING ANOMALIES

TECHNICAL FIELD

The present disclosure generally relates to vehicles, and more particularly relates to vehicle health monitoring systems.

BACKGROUND

Vehicles, such as aircraft, automobiles, spacecraft, watercraft, military vehicles or the like, may encounter unexpected anomalies during operation. In some cases, the anomalies may occur during an unusual combination of circumstances, such as an unusual maneuver being performed, or an orientation of a vehicle component relative to wind, rain, snow, road angle, current direction, or the like. The circumstances may be difficult for a maintenance technician to reproduce, thereby making the diagnosis and analysis of the anomaly difficult. Furthermore, sensors of the vehicle may not capture all of the possible data relevant to the anomaly, thus making diagnosis and analysis even more difficult.

BRIEF SUMMARY

In one embodiment, for example, a health monitoring system for monitoring a vehicle is provided. The health monitoring system may include, but is not limited to at least one sensor configured to collect data corresponding to the vehicle, a memory, and a processor communicatively coupled to the at least one sensor, the memory, and an interface system, the processor configured to: determine when the vehicle is experiencing an anomaly, collect, from the interface system, data corresponding to the anomaly from a user of the vehicle, and associate the data collected from the interface system and the data collected from the at least one sensor.

In another embodiment, for example, a method for controlling a health monitoring system for a vehicle is provided. The method may include, but is not limited to, determining, by a processor, when the vehicle is experiencing an anomaly, collecting, by the processor, data from at least one sensor and associating the data collected from the at least one sensor with the anomaly, collecting, by the processor, data from an interface system and associating the data collected from the interface system with the anomaly, and store, by the processor, the data associated with the anomaly in a memory.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a health monitoring system is provided. The health monitoring system may be utilized to diagnoses and reports anomalies in a vehicle. As discussed in further detail below, the health monitoring system detects an anomaly occurring with respect to one or more components of the vehicle. The anomaly may be any unexpected occurrence affecting one or more components in the vehicle. The health monitoring system, upon detection of the anomaly, gathers information from a user of the vehicle contemporaneously with the anomaly as well as from sensors or other systems on the vehicle. As discussed in further detail below, the health monitoring system may generate one or more questions to ask the user about the anomaly and/or ask the user to perform one or more functions with the vehicle to gather more data to aid in a subsequent analysis of the anomaly.

Figure 1:
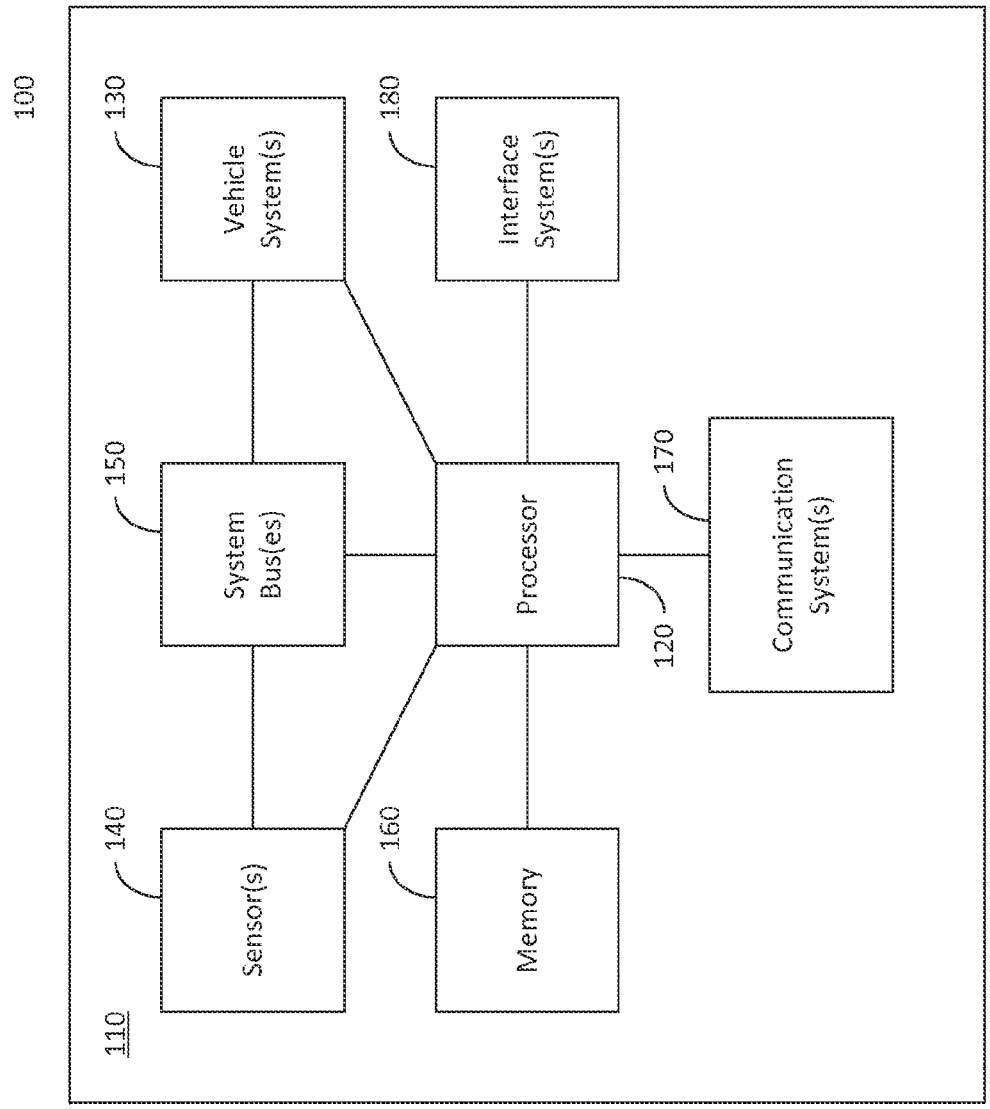
FIG. 1 is a block diagram of a vehicle, in accordance with an embodiment.

FIG. 1 is a block diagram of a vehicle 100, in accordance with an embodiment. The vehicle 100 may be a helicopter, an airplane, a spacecraft, an automobile, a motorcycle, a watercraft, or the like, or any combination thereof. The vehicle includes a health monitoring system 110. As discussed in further detail below, the health monitoring system 110 may diagnose and report vehicle anomalies.

The health monitoring system 110 includes at least one processor 120. The processor 120 may be a central processing unit (CPU), an application specific integrated circuit (ASIC), a field programmable gate array (FPGA), a microcontroller, or any other logic device or combination thereof. The processor 120 may be a stand-alone processor dedicated to the health monitoring system 110 or the processor 120 may be shared by one or more other vehicle systems 130. In another embodiment, for example, the processor 120 may be part of an external computer system brought into the vehicle 100, such as a tablet, laptop computer, cellular phone or the like.

The vehicle system(s) 130 incorporated into a vehicle 100 can vary depending upon the type of vehicle. Some possible vehicle systems 130 include, but are not limited to, health and usage management systems (HUMS), flight management systems (FMS), navigation systems, global positioning systems (GPS), fluid monitoring systems, cockpits, dashboards, central maintenance computer (CMC), satellite communication systems, engine systems, power management systems, environmental systems (both inside the vehicle and outside), hydraulic systems, fuel distribution systems, communication systems (radios, satcom, etc.), steering systems, gearbox systems, cooling systems, heating systems, a user monitoring system (heart rate, head position, point of gaze, etc.), or the like. The vehicle 100 may further include one or more sensors 140. The sensor(s) 140 may include, but are not limited to, wheel speed sensors, vibration sensors, engine rpm sensors, altimeters, air speed sensors, wind speed sensors, barometric pressure sensors, angle of attack sensors, flap location sensors, tachometers, tire pressure sensors, temperature sensors, voltage sensors, current sensors, conductivity sensors, strain sensors, particulate sensors, operator control position sensors, valve position sensors, flow rate sensors, viscosity sensors, mass flow sensors, gas composition sensors, individual gas sensors (O2, N2, etc.), moisture sensors, or any other vehicle sensor.

In one embodiment, for example, one or more of the vehicle systems 130 and/or one or more of the sensors 140 may directly send data to the processor 120 of the health monitoring system 110. However, the processor 120 may also extract data from one or more of the vehicle systems 130 and/or sensors 140 by monitoring one or more system buses 150. In other words, the processor 120 may read data being transmitted by between any other component of the vehicle 100 by monitoring data on a system bus 150 between the respective vehicle components. The system bus(es) 150 may include any hardwired bus, wireless bus or combination thereof, including, but not limited to MIL-STD-1553 bus, ARINC 429, IP-based network, CAN bus, or the like. The vehicle components coupled between the system bus(es) 140 may include, but are not limited to, another processor in the vehicle, vehicle system(s) 130, sensor(s) 140, or a communication system 170 or the like.

The processor 120 may store at least a portion of the data from the vehicle system(s) 130 and sensor(s) 140 in a memory 160. The memory 160 may be any combination of volatile and non-volatile memory. In the embodiment illustrated in FIG. 1, the memory 160 is located on the vehicle 100. However, the memory 160 could also be located remotely, such as a cloud based storage system. In these embodiments, the processor 120 may transmit the data from the vehicle via the communication system 170. The communication system 170 may be a cellular based system, a satellite based system, a WIFI based system, a ZIGBEE based system, or any other data transmission system or combination thereof. As discussed in further detail below, the data stored in the memory 160 is used by the health monitoring system 110 to diagnose and report vehicle anomalies.

The health monitoring system 110 further includes one or more interface systems 180. The interface system(s) 180 allow the processor 120 to receive user input. In one embodiment, for example, an interface system 180 may be integrated into a vehicle system 130, such as a cockpit interface (e.g., a touchscreen display, or button(s) on the cockpit dash). However, an interface system 180 could also be part of a separate device, such as a tablet, laptop, cellphone or the like. In these embodiment, for example, the interface system 180 may be part of an application running on the separate device.

The interface system(s) 180 may include, but are not limited to, voice recognition systems, touchscreen display systems, displays, keyboards, mice, trackballs, or the like or any combination thereof. In one embodiment, for example, the interface system 180 may include a dedicated anomaly alert interface, such as a dedicated physical button or a dedicated virtual button displayed on a touchscreen or other display device. As discussed in further detail below, when a user interacts with the dedicated anomaly alert interface of the interface system(s) 180, the processor 120 is alerted to a possible anomaly, as described in further detail below. In one embodiment, for example, the interface system 180 may have multiple dedicated anomaly buttons. For example, the interface system 180 may have a dedicated vibration button, a dedicated smell button, a dedicated noise button or the like.

Figure 2:
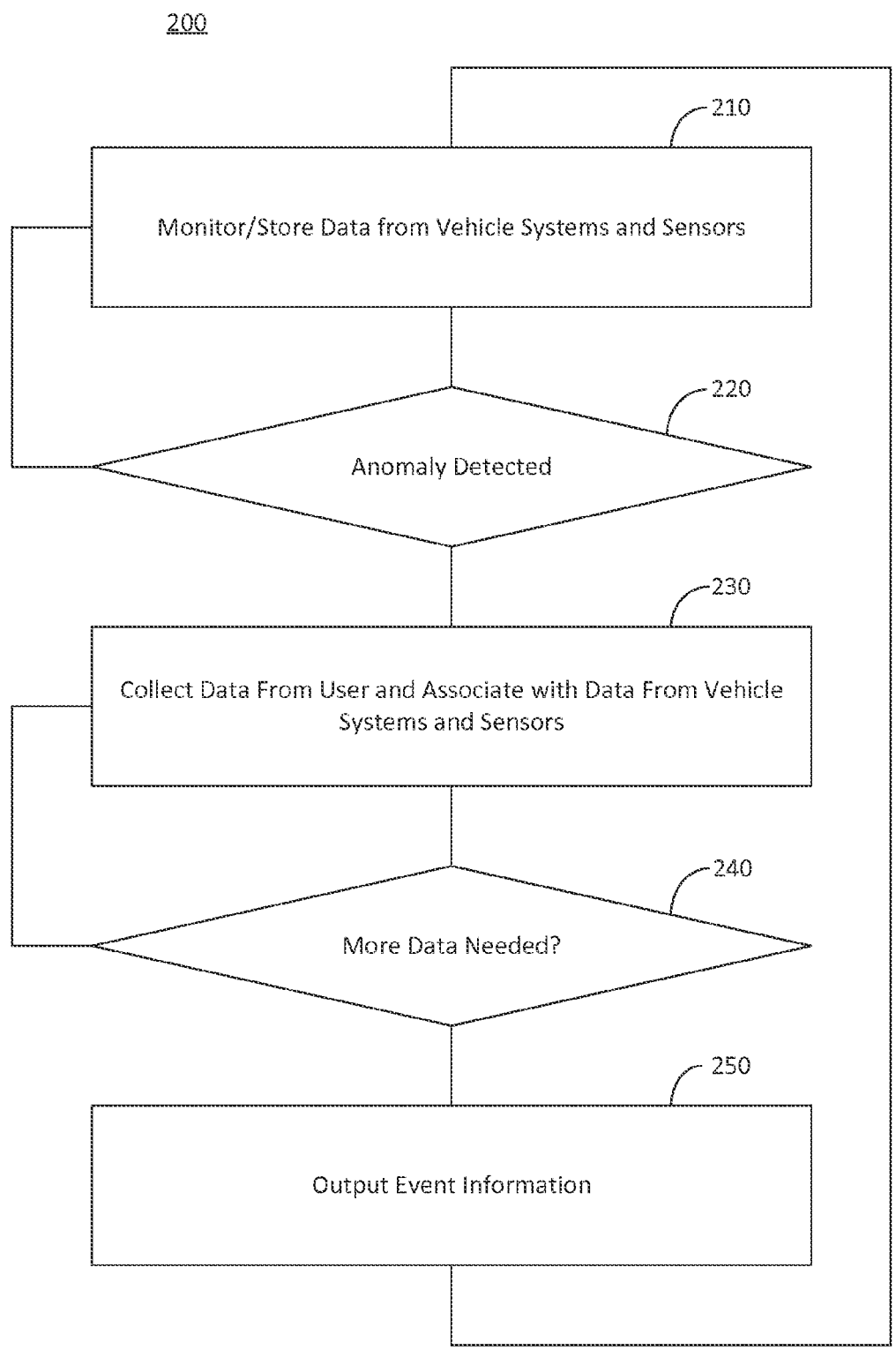
FIG. 2 is a flow diagram illustrating an exemplary method for operating the health monitoring system, in accordance with an embodiment.

FIG. 2 is a flow diagram illustrating an exemplary method 200 for operating the health monitoring system 110, in accordance with an embodiment. The processor 120 first monitors and stores data from the vehicle system(s) 130 and sensor(s) 140. (Step 210). The data from the vehicle system (s) 130 and sensors(s) 140 is stored in the memory 160. As discussed above, the processor 120 may receive a stream of data directly from the vehicle system(s) 130 or sensor(s) 140, and/or may monitor one or more system buses 150 coupled between any components of the vehicle 100. In one embodiment, for example, the processor 120 may store all of the data collected from the vehicle system(s) 130 and sensor(s) 140 at least for the duration of a vehicle action period. The vehicle action period may be, for example, a single flight, multiple flights, time between maintenance service, a predetermined period of time or distance, or the like. However, in other embodiments, the processor 120 may store the data from the vehicle system(s) 130 and sensor(s) 140 in a temporary buffer in the memory 160. When an anomaly is detected, as discussed in further detail below, at least a portion of the data from the temporary buffer in the memory 160 may be converted into a non-volatile memory for later analysis.

The processor 120 next determines if an anomaly is detected. (Step 220). The anomaly can be detected by either a user (e.g., the pilot, crew, driver, etc.) of the vehicle 100, by a vehicle system 130, and/or by the processor 120 itself. When the vehicle 100 includes a health and usage management system (HUMS), a flight management system (FMS), or the like, the respective system may analyze data from one or more sensors 140 (either getting data directly from the sensor or via reading data on a bus) to detect the anomaly. A processor of the vehicle system 130 or the processor 120 of the health monitoring system 110 may compare data from one or more sensors 140 or other vehicle systems 130 against known fault models. In other words, the respective processor may compare data from the vehicle system(s) 130 and sensor(s) 140 to data corresponding to known faults or other known states with the vehicle. For example, a vibration sensor detecting a vibration in a chassis of the vehicle over a predetermined threshold may trigger an inquiry by the respective processor. The inquiry may attempt to correlate the vibration data with data from other vehicle system(s) 130 and/or sensor(s) 140 to determine if the vibration is expected (either a known vehicle fault, a known vehicle state) or if the vibration is an anomaly. A known vehicle state of a vehicle is a vehicle state which is expected under certain conditions. For example, a known vehicle state may be that a vibration in the chassis is expected when a road monitoring sensor detects a bumpy road. Likewise, a known vehicle fault is a known fault of the vehicle under certain conditions. For example, a helicopter chassis may be known to vibrate under certain engine rpm, wind direction and flap position conditions. In contrast, an anomaly occurs when data from one or more vehicle systems cannot be correlated to a known vehicle state or a known vehicle fault. As discussed in further detail below, the processor 120 may collect further data from a user of the vehicle when an anomaly occurs. One, multiple or all of the known vehicle faults may also be treated as anomalies. In other words, when a known vehicle fault occurs, the processor 120 may flag data occurring around the fault for later analysis. The processor 120 may receive an indication of flagged known vehicle faults via the communication system 170. As discussed above, some vehicle states may be difficult to reproduce by maintenance technicians, such as certain road conditions, weather conditions (e.g., rain, snow, wind speed, wind direction, atmospheric pressure, etc.), water conditions or the like. Accordingly, when the respective processor detects a flagged known vehicle fault, the processor 120 may treat the flagged known vehicle fault as an anomaly, as discussed in further detail below.

As discussed above, the anomaly could also be detected by a user of the vehicle 100. For example, a user of the vehicle may smell an unusual smell, feel an odd vibration, hear an unusual sound, or the like. In these instances, a user can utilize the interface system 180 to inform the health monitoring system 110 that an anomaly is occurring. As discussed above, the interface system 180 may include one or more dedicated anomaly buttons to inform the health monitoring system 110 that an anomaly is occurring. In another embodiment, for example, when the interface system 180 includes a voice recognition system, the user may be able to inform the health monitoring system 110 merely using their voice. Accordingly, the interface system 180 allows the user to quickly indicate that an anomaly is occurring while the anomaly is still occurring or within a short time of the anomaly with minimal effort or distraction for the user. This allows the health monitoring system 110 the ability to associate data from the vehicle system(s) 130 and sensor(s) 140 with the anomaly contemporaneously with the anomaly, thereby improving the chances that a processor 120, vehicle system 130 or a maintenance technician will be able to determine what caused the anomaly. As described in further detail below, the interface system(s) 180 may also provide a the user with an easy way to provide additional comments about the anomaly.

When an anomaly is detected, either by the processor 120, a vehicle system 130 or a user through the interface system 180, the processor 120, or a processor of a vehicle system 130, then collects data from the sensor(s) 150, system bus(es) 160, and/or vehicle system(s) 130 and data from the user, associates the collected data with the anomaly and saves the data in the memory 160. (Step 230). As discussed above, the processor 120 may be directly coupled to one or more sensors 140, may be directly coupled to one or more vehicle system 130, and/or may read data from one or more system buses 150 to collect data on the state of the vehicle. As discussed above, the processor 120 may save a predetermined amount of data from the sensor(s) 140 and/or vehicle system(s) 130 before and after an anomaly is detected. The predetermined amount of data may be based upon a physical storage size (i.e., save 500 megabytes of data), a time (e.g., 30 seconds before and after the anomaly was detected), or a combination thereof.

However, the sensor(s) 140 and vehicle system(s) 130 may not be able to gather all of the potential data on the anomaly. Accordingly, as discussed above, the processor 120 also collects data from the user of the vehicle 100. The data may be collected from the user through the interface system(s) 180. The processor 120 may collect data on a smell (e.g., a burning smell near a vehicle component, an acrid smell near a vehicle component, etc.), a sound (e.g., a whine from a rear wheel, an unusual sound when adjusting a flap, etc.), a touch (e.g., a component feeling hot, a vibration in a vehicle component), data on a maneuver or operation the vehicle was executing at the time of the anomaly, or the like. Accordingly, the user of the vehicle 100 operates essentially as an additional sensor for the health monitoring system 110, thereby increasing the amount of data collected on an anomaly. Furthermore, because the data is collected from the user of the vehicle 100 contemporaneously with the anomaly, the accuracy of the data is increased. In other words, a user does not have to remember when the anomaly occurred or what they were doing as the processor 120 associates the data collected from the various components 130-150 of the vehicle 100 and the data collected from the user with the anomaly.

The user data may be collected in any number of ways depending upon the interface system(s) 180 present in the vehicle. As discussed above, the interface system 180 may include a voice recognition system. In these embodiments, a user can simply verbally input the data to the health monitoring system 110. In other embodiments, the interface system may include a touchscreen display, a non-touch display, a keyboard, a mouse, a trackball, or the like, or any combination thereof. In these embodiments, the user may manually input the data into the health monitoring system 110 through the one or more physical input devices and/or voice recognition devices. In order to simplify the data input, certain options may be presented to the user via buttons, menus (e.g., a drop down menu), or the like to minimize user distraction. In embodiments where the interface system 180 is part of a device separate from the vehicle 100, such as a tablet, laptop, cellphone, or the like, the data collected through the interface system may be transmitted to the processor 120 or a processor of a vehicle system 130 via a communication system.

The processor 120 or a processor of a vehicle system 130, based upon the data collected from the vehicle components and the data collected from the user through the interface system 180, may then determine if more data is needed from the user. (Step 240). Certain vehicle conditions may not be easily reproducible by a technician, such as those conditions which occur in response to a particular in air maneuver, weather conditions, or the like, or a combination thereof. Accordingly, in order to further aid diagnosis of the vehicle 100, the processor 120 or a processor of a vehicle system 130 may request further data from the user. The determination to request more data may be based upon the type of anomaly detected. As discussed above, some anomalies may be known vehicle faults which have been flagged by a maintenance technician. In these instances, the maintenance technician may include one or more observational questions and/or diagnostic questions so that the maintenance technician can better analyze the anomaly, as discussed in further detail below. The processor 120 or a processor of a vehicle system 130 may also independently generate one or more observational questions and/or diagnostic questions based upon the anomaly. For example, if a certain component of the vehicle is being affected by the anomaly, the processor 120 or a processor of a vehicle system 130 may generate the additional questions to gather more information on the vehicle component such that there is more data for analysis. The additional data may be used by the processor to correlate the anomaly with a known vehicle state, known vehicle fault, and/or may be used by a maintenance technician for subsequent analysis of the anomaly.

The additional data requested by the processor 120 or a processor of a vehicle system 130 may include observational questions and/or diagnostic questions. Observational questions may ask the user if they notice something about a vehicular component. For example, the processor 120 may output, via the interface system, "Do you notice excess vibration in component X?" or "Do you notice an acrid smell near or around component X?" In contrast, diagnostic questions ask the user to perform an action with the vehicle 100 so that the vehicle system(s) 130 and/or sensor(s) 140 can gather more details on the anomaly. For example, a diagnostic question may be "If possible, please climb at a rate of x ft/second," or "If possible, operate the engines at 90% power and report a rate of fuel consumption," ask to change engine RPM, ask to flip a breaker on and off, ask to change altitude, ask to drive the vehicle in an S-pattern. Accordingly, the health monitoring system 110 can engage the user of the vehicle 100 as a tool for diagnosing and reporting vehicle anomalies.

When the processor 120 or a processor of a vehicle system 130 determines that more data is needed, the processor 120 or the processor of a vehicle system 130 returns to step 230 to ask the determined questions and collect the data. After asking one or more questions to the user, the processor 120 or the processor of a vehicle system 130 upon return to Step 240 may analyze the results of the additionally collected data and determine if more data is needed.

When no further data is needed, or the vehicle operators were unable to answer a question or perform the requested action, the processor 120 or the processor of a vehicle system 130 outputs anomaly event information via the interface system(s) 180. (Step 250). In one embodiment, for example, the event information may include a safety level of the vehicle 100. The safety level may indicate a severity of the anomaly. In other words, the safety level may indicate whether or not the vehicle is still safe to operate. If the safety level is above a predetermine threshold indicative that the vehicle is no longer safe to operate, the processor 120 may output a corresponding warning to the vehicle operator. The safety level may also indicate whether or not the vehicle should be serviced immediately or whether the anomaly can be analyzed during a subsequent scheduled maintenance of the vehicle. The event information could also include details on the anomaly such that the operator is aware of a possible fault to a component of the vehicle 100. The event information, including the safety level, may be output to the user via the interface system 180.

In one embodiment, for example, the event information may also be transmitted to a maintenance system via the communication system 170. The maintenance system, for example, could flag the vehicle to be pulled from service for maintenance. The maintenance system could also upload an indication of the anomaly as a known vehicle fault to other vehicles in communication with the maintenance system. This would allow health monitoring systems 110 in other vehicles to gather information on the anomaly as discussed above. After the event information is output, the processor 120 returns to step 210 to continue to monitor the vehicle 100 for anomalies.

While the detailed description above discussed a health monitoring system 110 in the context of a vehicle, the health monitoring system could be implemented in a variety of settings, such as a factory or any other setting with large machinery, in a home, in a commercial building, in portably machinery, or the like.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A health monitoring system for monitoring a vehicle, comprising: at least one sensor configured to collect data corresponding to the vehicle; a memory; and a processor communicatively coupled to the at least one sensor, the memory, and an interface system, the processor configured to: determine when the vehicle is experiencing an anomaly; collect, after the processor determines that the vehicle is experiencing the anomaly, user observed anomaly data corresponding to the anomaly from a user of the vehicle from the interface system; and associate the user observed anomaly data collected from the interface system with the data collected from the at least one sensor during the anomaly, wherein the processor is further configured to: determine, based upon the user observed anomaly data collected from the interface system and the data collected from the at least one sensor, a vehicle safety level; and output, to the interface system, the vehicle safety level.

2. The health monitoring system of claim 1, wherein the processor is further configured to output a warning through the interface system when the vehicle safety level exceeds a predetermined threshold.

3. The health monitoring system of claim 1, wherein the processor is configured to determine when the vehicle is experiencing the anomaly based upon data from the interface system.

4. The health monitoring system of claim 1, further comprising: a vehicle system communicatively coupled to the at least one sensor and the processor, wherein the processor is configured to determine when the vehicle is experiencing an anomaly based upon data from the at least one sensor and data from the vehicle system.

5. The health monitoring system of claim 4, wherein the vehicle system is a health and usage management system.

6. The health monitoring system of claim 4, wherein the vehicle system outputs an indication of an anomaly when data from the at least one sensor does not correspond to a known vehicle state or a known vehicle fault.

7. The health monitoring system of claim 1, wherein the processor is further configured to: determine, based upon the user observed anomaly data collected from the interface system and the data collected from the at least one sensor, whether additional data is needed to analyze the data collected from the interface system and the data collected from the at least one sensor; and output, via the interface system, at least one question when the processor determines additional data is needed to analyze the data collected from the interface system and the data collected from the at least one sensor.

8. The health monitoring system of claim 7, wherein the at least one question is an observational question.

9. The health monitoring system of claim 7, wherein the at least one question is a diagnostic question.

10. The health monitoring system of claim 1, wherein the interface system comprises a voice recognition system.

11. A method for controlling a health monitoring system for a vehicle, comprising: determining, by a processor, when the vehicle is experiencing an anomaly; collecting, by the processor, sensor data from at least one sensor and associating the data collected from the at least one sensor with the anomaly when the processor determines the vehicle is experiencing the anomaly; collecting, by the processor, user observed anomaly data from an interface system and associating the user observed anomaly data collected from the interface system with the anomaly when the processor determines the vehicle is experiencing the anomaly; and storing, by the processor, the sensor data associated with the anomaly and the user observed anomaly associated with the anomaly in a memory; the method further comprising: determining, by the processor, a safety level of the vehicle based upon the sensor data associated with the anomaly and the user observed anomaly associated with the anomaly; and outputting, by the processor, the determined safety level via the interface system.

12. The method of claim 11, wherein the determining when the vehicle is experiencing the anomaly further comprises, determining the vehicle is experiencing the anomaly based upon user data received from the interface system.

13. The method of claim 11, wherein the determining when the vehicle is experiencing the anomaly further comprises receiving, from a vehicle system, an indication of the anomaly when data from the at least one sensor does not correspond to a known vehicle state or a known vehicle fault.

14. The method of claim 11, wherein the determining when the vehicle is experiencing the anomaly further comprises determining, by the processor, that the vehicle is experiencing an anomaly when data from the at least one sensor does not correspond to a known vehicle state or a known vehicle fault.

15. The method of claim 11, wherein the processor is further configured output a warning via the interface system when the safety level exceeds a predetermined threshold.

16. The method of claim 15, further comprising: determining, by the processor, when additional data is needed to analyze the data associated with the anomaly based upon the sensor data associated with the anomaly and the user observed anomaly associated with the anomaly; outputting, by the processor, at least one question when the processor determines additional data is needed to analyze the data associated with the anomaly via the interface system; and determining, by the processor, the safety level of the vehicle based upon the data associated with the anomaly.

17. The method of claim 16, wherein the at least one question is an observational question.

18. The method of claim 16, wherein the at least one question is a diagnostic question.

* * * * *